UNITED STATES PATENT OFFICE.

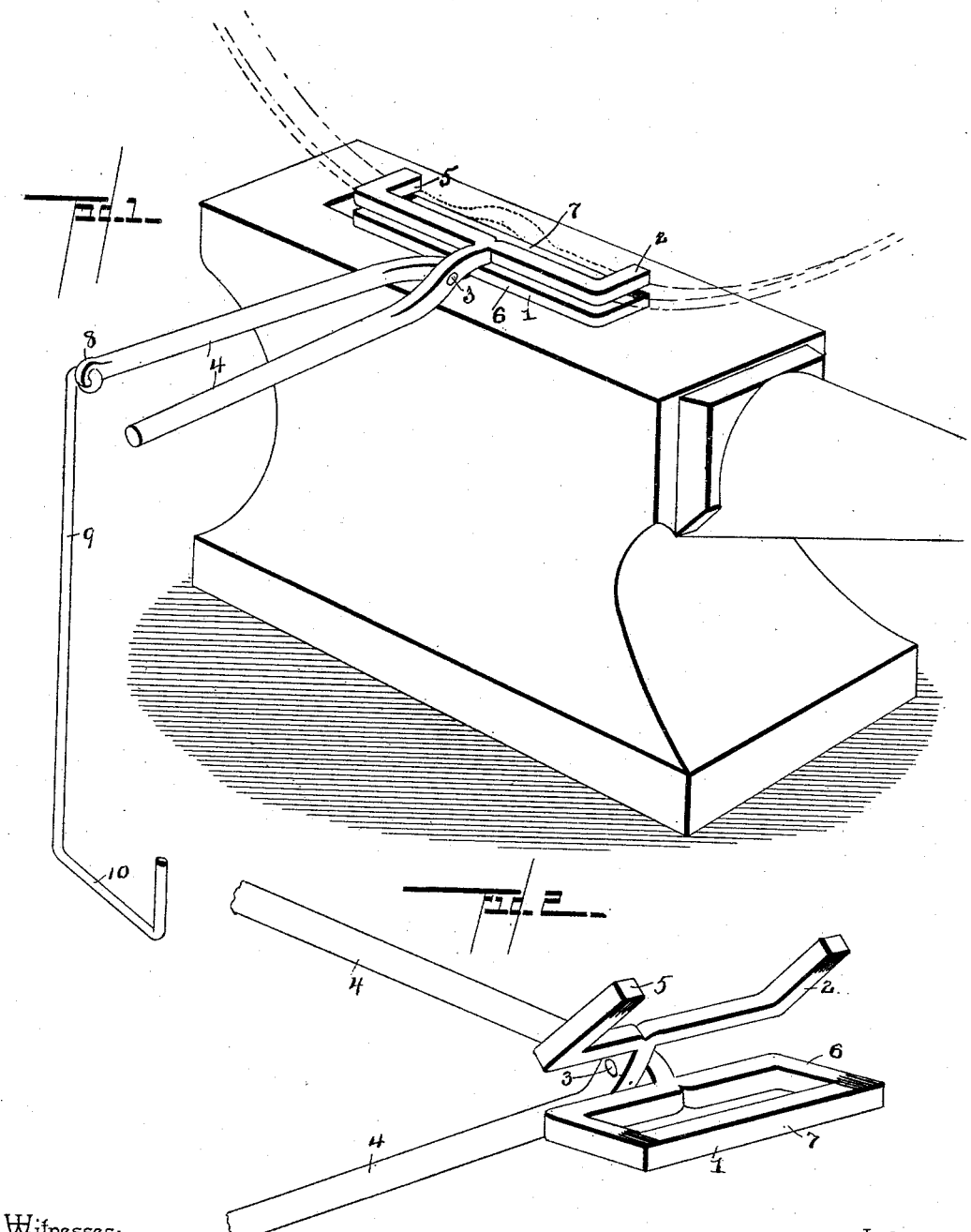

JOHN M. LILES AND JAMES B. WILLIAMS, OF ROCKINGHAM, NORTH CAROLINA, ASSIGNORS OF ONE-THIRD TO WILLIE A. WILLIAMS, OF SAME PLACE.

TIRE-SHRINKER.

SPECIFICATION forming part of Letters Patent No. 474,392, dated May 10, 1892.

Application filed October 6, 1891. Serial No. 407,873. (No model.)

*To all whom it may concern:*

Be it known that we, JOHN M. LILES and JAMES B. WILLIAMS, citizens of the United States, residing at Rockingham, in the county of Richmond and State of North Carolina, have invented a new and useful Tire-Shrinker, of which the following is a specification.

This invention relates to a shrinking device for shrinking metal, such as tires, iron bands and hoops, rods, &c.; and the objects in view are to provide a device of cheap and simple construction adapted to securely hold the object while being shrunk and to be applied and removed readily to and from the same.

Other objects and advantages of the invention will appear in the following description, and the novel features thereof will be particularly pointed out in the claims.

Referring to the drawings, Figure 1 is a perspective of a shrinking device constructed in accordance with our invention, a portion of a tire in the act of being shrunk being shown in dotted lines in position therein. Fig. 2 is a perspective view of the two jaws.

Like numerals of reference indicate like parts in all the figures of the drawings.

In practicing our invention we construct a pair of tongs, the same consisting of a pair of members, designated as the "supporting member" 1 and the "clamping member" 2. These members are slightly curved or offset near their outer ends, flattened, crossed, and pivoted together by a transverse rivet or bolt 3. In rear of their pivot the members are made cylindrical, so as to form a pair of handles 4, adapted to be grasped by the hand and compressed. In front of their pivot the members are bifurcated, forming an upper jaw (designated as the "clamping-jaw") 5 and a lower jaw (designated as the "supporting-jaw") 6. The bifurcations of the jaws are bent at a right angle, as shown, whereby the jaws are given a general U shape, and the lower supporting-jaw 6 has its terminals connected by a cross-bar 7, the upper face of which is roughened at the ends of the jaw and is flush with the faces of the bifurcated portions of said jaw.

An eye 8, formed in the handle of the supporting member, has loosely engaged therein a depending rod 9, and the latter at its lower end is bent to form a stirrup 10, adapted to receive the foot of the operator.

In operation in order to shrink a bar of iron, a metal band, or a tire and decrease the length of the same it is first heated and afterward placed upon the horn of an anvil and by applications of a hammer kinked or offset, as shown by dotted lines in the tire illustrated in Fig. 1. When thus kinked and while in a heated condition, the tire is placed between the two jaws, the kinked portion being located between the terminals of the clamping-jaw and directly over the cross-bar of the supporting-jaw. The foot of the operator is placed in the stirrup and the two handles grasped by his hand, which serves to clamp the two jaws tightly upon the tire at opposite sides of the kink, while the remaining hand of the operator is left free to manipulate the hammer, which is brought down upon the kinked portion of the tire, and the latter thus hammered out or spread. When this is completed, it will be seen that the shrinkage of the tire is completed. If desired, thin or worn portions of a tire may thus be increased in thickness and the tire improved and made stronger. Such treatment of a tire will be found far superior and more easily accomplished than the ordinary operation of cutting and subsequently welding the ends together.

It will be seen from the foregoing description that the device constructed after our invention is of very simple construction, may be cheaply manufactured and sold, and is highly useful.

Having described our invention, what we claim is—

1. The herein-described shrinking device, consisting of the opposite crossed members terminating at their rear ends in handles and at their front ends bifurcated and bent to form U-shaped jaws, the lower jaw having its terminals connected by a cross-bar, substantially as specified.

2. The herein-described shrinking device, consisting of the opposite crossed members terminating at their rear ends in handles and at their front ends bifurcated and bent to form U-shaped jaws, the lower jaw having its terminals connected by a cross-bar and roughened below the terminals of the upper jaw, substantially as specified.

3. The herein-described shrinking device, consisting of the two members crossed and pivoted together and terminating beyond their pivot in clamping-jaws, one of said members being provided at its rear end with an eye, and a rod loosely hung in the eye and bent to form a stirrup, substantially as specified.

In testimony that we claim the foregoing as our own we have hereto affixed our signatures in the presence of two witnesses.

JOHN M. LILES.
JAMES B. $\overset{\text{his}}{\times}$ WILLIAMS.
$\quad\quad\quad\;$ mark Witnesses:
   D. M. MORRISON,
   T. C. GUTHRIE.